United States Patent
Rogers et al.

(10) Patent No.: US 9,049,082 B2
(45) Date of Patent: Jun. 2, 2015

(54) CARRIER FREQUENCY AND PHASE RECOVERY IN QUADRATURE ENCODED E-BAND COMMUNICATIONS

(71) Applicant: AOptix Technologies, Inc., Campbell, CA (US)

(72) Inventors: Gregory Eric Rogers, San Jose, CA (US); Scott Wetenkamp, Los Altos, CA (US); Scott Alan Young, Campbell, CA (US); Srinivas Sivaprakasam, Fremont, CA (US)

(73) Assignee: Aoptix Technologies, Inc., Campbell, CA (US)

( * ) Notice: Subject to any disclaimer, the term of this patent is extended or adjusted under 35 U.S.C. 154(b) by 0 days.

(21) Appl. No.: 14/252,590

(22) Filed: Apr. 14, 2014

(65) Prior Publication Data
US 2014/0307835 A1 Oct. 16, 2014

Related U.S. Application Data

(60) Provisional application No. 61/821,632, filed on May 9, 2013, provisional application No. 61/812,163, filed on Apr. 15, 2013.

(51) Int. Cl.
| | |
|---|---|
| *H04L 27/14* | (2006.01) |
| *H04L 27/152* | (2006.01) |
| *H04L 27/148* | (2006.01) |
| *H04L 27/227* | (2006.01) |
| *H04L 27/38* | (2006.01) |
| *H04L 27/20* | (2006.01) |
| *H04L 27/36* | (2006.01) |

(52) U.S. Cl.
CPC .......... *H04L 27/1525* (2013.01); *H04L 27/148* (2013.01); *H04L 27/206* (2013.01); *H04L 27/2275* (2013.01); *H04L 27/362* (2013.01); *H04L 27/3836* (2013.01)

(58) Field of Classification Search
USPC .................... 375/326, 226, 224, 320; 327/157
See application file for complete search history.

(56) References Cited

U.S. PATENT DOCUMENTS

| | | | |
|---|---|---|---|
| 2,947,860 | A | 8/1960 | Alvernaz |
| 4,926,500 | A | 5/1990 | Tsuda et al. |
| 5,974,094 | A | 10/1999 | Fines et al. |
| 6,337,888 | B1 | 1/2002 | Huang et al. |

(Continued)

OTHER PUBLICATIONS

PCT International Search Report and Written Opinion, PCT Application No. PCT/US2014/034051, Aug. 22, 2014, ten pages.

*Primary Examiner* — Eva Puente
(74) *Attorney, Agent, or Firm* — Fenwick & West LLP

(57) ABSTRACT

A mechanism for retrieval of carrier frequency and carrier phase in a received modulated carrier waveform. Retrieval of carrier frequency and carrier phase can be implemented in an analog electrical circuit, using a field programmable gate array (FPGA), or in computer code. Independent of the implementation, the mechanism performs frequency and primary phase recovery by forcing transforms of a pilot tone in the upper and lower sidebands to the same frequency using a feedback loop. The difference-in-magnitudes of the channelized pilot are used by a phase lock loop to perform secondary phase recovery in a manner that also resolves phase sign ambiguity. Benefits of this mechanism include improved phase lock loop tracking performance and a reduction of noise in the data demodulated from the received carrier waveform.

16 Claims, 7 Drawing Sheets

(56) References Cited

U.S. PATENT DOCUMENTS

| | | |
|---|---|---|
| 6,701,133 B1 | 3/2004 | Bennett et al. |
| 7,389,055 B1 | 6/2008 | Rickard et al. |
| 2006/0078071 A1* | 4/2006 | Lee ............................. 375/326 |
| 2007/0133993 A1 | 6/2007 | Yee et al. |
| 2009/0135968 A1 | 5/2009 | Braun et al. |
| 2013/0064278 A1* | 3/2013 | Yu ................................. 375/226 |
| 2013/0279554 A1* | 10/2013 | Cheng et al. .................. 375/226 |
| 2014/0091843 A1* | 4/2014 | Upadhyaya et al. .......... 327/157 |

* cited by examiner

CARRIER FREQUENCY AND PHASE RECOVERY IN QUADRATURE ENCODED E-BAND COMMUNICATIONS

CROSS-REFERENCE TO RELATED APPLICATIONS

This application claims the benefit of U.S. Provisional Patent Application No. 61/821,632, entitled "Carrier Frequency and Phase Recovery in QPSK E-Band Communications," filed on May 9, 2013, and U.S. Provisional Patent Application No. 61/812,163, entitled "Carrier Frequency and Phase Recovery in QPSK E-Band Communications," filed on Apr. 15, 2013, both of which are hereby incorporated by reference in their entireties.

BACKGROUND

1. Field of Invention

This application relates generally to radio frequency communications systems, and in particular to compensating carrier wave frequency and phase recovery in such systems.

2. Description of the Related Arts

In a radio frequency communication system, information is transmitted by a transmitter to a receiver via a carrier waveform. The transmitter encodes the information in the carrier waveform by changing the carrier waveform's phase, frequency, and/or amplitude. The receiver down-converts the received signal to remove the carrier waveform, leaving just the modifications that encode the information (under ideal conditions). In a quadrature phase-shift keying (QPSK) or Quadrature Amplitude Modulation (QAM) system, the down-converting also splits the signal into an in-phase component (the "I-channel") and a quadrature-phase component (the "Q-channel), which is offset from the I-channel by 90 degrees. However, in order to accurately recover (or demodulate) the encoded information, the receiver must first know the frequency and phase of the carrier waveform to establish a baseline upon which the information is encoded. More specifically, this baseline set of information allows the receiver to preserve the fidelity of the transmitted information and maintain the isolation of channels. The process employed to determine this baseline information is referred to as carrier recovery.

In most existing systems, transmitters and receivers each contain independent oscillators used for modulation and demodulation of the carrier signal. As such, the oscillator of the transmitter is not necessarily matched in frequency and phase with the oscillator of the receiver. This mismatch may prevent the receiver from performing accurate demodulation of the carrier signal.

Carrier recovery may be performed a number of different ways. Common techniques include: (a) use of a matched filter centred at the carrier frequency for phase determination, (b) implementation of a simple phase lock loop, and (c) a combination of (a) and (b). However, these techniques require a sufficiently strong carrier signal, and increasing the power dedicated to the carrier reduces the power available for carrier modulation. Increasing the carrier power in order to perform carrier recovery results in less power being available to the data sidebands, and thus lesser efficiency.

Another approach for carrier recovery and demodulation of the carrier signal is the Costas Phase Lock Loop (PLL), also referred to as a Costas Loop. The QPSK Costas Loop uses the fact that the modulation constellation points are always where the magnitude of the I and Q signals are equal. Only the signs are different, so it decodes the quadrant information and develops an error signal proportional to the difference of the magnitudes (keeping the sign information). This error signal is integrated and filtered and then used to correct the receive local oscillator frequency and phase. While this works well for narrow bandwidths, the wideband switching and differential circuits can be difficult to design and keep stable due to the speed of switching required. Further, systems using a Costas Loop may require a priori knowledge regarding the type of encoding used in the signal.

SUMMARY

This application relates to the use of an improved technique over current state of practice for carrier recovery that, among other advantages is independent of the modulation format of the received signal and does not incur latency, regardless of the modulation method used. In one embodiment, a transmitted carrier pilot tone (e.g., at 1 MHz) superimposed upon the carrier waveform that is balanced in amplitude and equal in phase in each channel is recovered. The pilot tone is created in such a way that the upper and lower sidebands can be compared and the error signal used to achieve carrier lock. The pilot tone is modulated onto the I channel and the Q channel in phase and with the same frequency. This enables the receiver to lock the carrier frequency and phase by matching the transforms of the pilot tone in the upper and lower sidebands of the received signal.

The carrier recovery process includes two functional interrelated processes; frequency recovery, and phase recovery. In one embodiment, frequency recovery is performed prior to phase recovery. Frequency recovery locks the frequency of a reference signal generated by a local oscillator to the frequency of the carrier waveform of a received signal containing a pilot tone isolated from the encoded data. The received signal is down-converted to baseband channels, which contain dual transforms of the pilot tone, one in the upper sideband and the other in the lower sideband.

A frequency error is determined based on the difference in frequency between the pilot tone transform in the upper side band and the image of the pilot tone transform in the lower sideband. The frequency error is fed back to the local oscillator and the frequency of the reference signal is adjusted accordingly. When the reference signal is at the same frequency as the carrier waveform, the pilot tone transform in each sideband will be at the same frequency.

In some embodiments, carrier phase recovery is performed in two stages, one using the transforms of the pilot tone and the other based on the difference-in-magnitudes between the I-channel and the Q-channel, regardless of the detector magnitude scaling (e.g., exponential, logarithmic, etc.). By forcing the pilot tone transforms in the upper and lower sidebands to have the same phase, the phase of the local oscillator is approximately matched to that of the carrier. In one embodiment, the difference-in-squares of the I-channel amplitude and the Q-channel amplitude are used to fine tune the phase of the local oscillator to account for distortions and/or systematic errors within the receiver. The phase error determined using the difference-in-magnitudes includes both a magnitude and a direction, i.e., whether the phase offset is positive or negative. The phase error is fed back to the local oscillator controller, which adjusts the phase of the reference signal to more closely match that of the carrier waveform.

In various embodiments, a dedicated analog recovery circuit is used for carrier recovery. In one such embodiment, the analog recovery circuit comprises a phase frequency detector (PFD) used to match the frequency and phase of the pilot tone transforms and amplitude balance phase detectors used to compare the power of the I and Q channels. The PFD and the amplitude balance phase detectors work cooperatively in a multi-loop feedback system. In other embodiments, carrier recovery is performed in software, such as a Software Defined Radio hosted by an internal Field Programmable Gate Array (FPGA). In further embodiments, combinations of analog and software processing are used.

Other features and objectives of the present invention will be apparent from the following description and claims and are illustrated in the accompanying drawings, which by way of illustration, show preferred embodiments of the present invention and the principles thereof. Other embodiments of the invention embodying the same or equivalent principles may be used and structural changes may be made as desired by those skilled in the art without departing from the present invention or purview of the appended claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

General Overview

The carrier recovery process determines the carrier frequency and phase of an arriving signal in order to demodulate and extract data from the signal. In contrast to the use of other schemes, embodiments of the system and process described herein do not require a priori knowledge of the data format of the received signal. The receiver may include a local voltage controlled oscillator (VCO) that generates a reference signal to assist in reception and processing of the received signal. In one embodiment, carrier recovery uses the local VCO to determine the frequency and phase of the carrier waveform as a function of the difference between the frequency and phase of the reference signal and the received carrier waveform. The frequency and phase difference are determined using information obtained directly from the received signal to determine the carrier waveform at the receiver. Reconstruction of the carrier waveform enables accurate data demodulation, and thus accurate reception of the data contained within the received signal. In one embodiment, carrier recovery is performed for a received quadrature encoded signal by frequency and phase recovery.

Figure 1A:
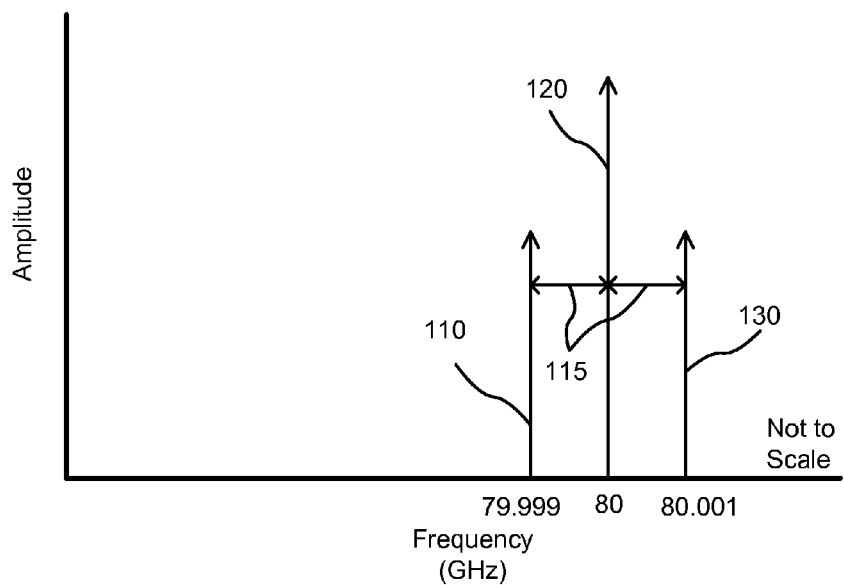
FIG. 1A is a chart illustrating the relationship between the carrier frequency and the presence of the pilot frequency heterodynes in the upper and lower sidebands, according to one embodiment.
Figure 1B:
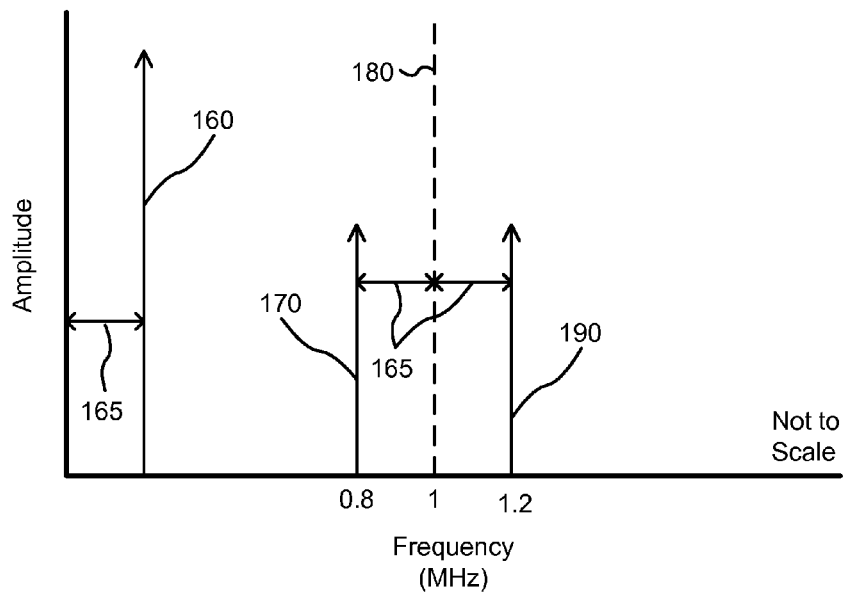
FIG. 1B is a chart illustrating the relationship between the frequency offset of the carrier frequency and the upper and lower sideband transform of the pilot frequency after direct conversion, according to one embodiment.

FIGS. 1A and 1B illustrate the general principles of a method by which carrier frequency and phase recovery can be achieved at a receiver, in accordance with one embodiment. The receiver receives a signal from a transmitter (not shown). Data was encoded into the received signal by the transmitter by modulation of a carrier waveform at a carrier frequency 120. The transmitted signal also includes a pilot signal at a pilot frequency superimposed on the carrier, which is modulated onto the I and Q channels with equal amplitude and either in phase or 180 degrees out of phase with respect to each other. Thus, as shown in FIG. 1A, heterodynes 110 and 130 exist on either side of the carrier frequency in the upper and lower sidebands. In frequency space, the lower sideband heterodyne 110 and the upper side band heterodyne 130 are each spaced from the carrier 120 by a separation 115 equal to the pilot frequency. In the illustrated embodiment, the carrier has a frequency of 80 GHz and the pilot signal has a frequency of 1 MHz, but other frequencies can be used. For example, a device using the carrier recovery system described herein might be configurable to use a carrier frequency selected from the range 70 GHz to 90 GHz and a pilot tone selected from the range 500 kHz to the data clock frequency. In one embodiment, a pilot tone frequency of 1 MHz is used.

The receiver mixes (or converts) the received signal with the reference signal generated by a local oscillator (e.g., a VCO). Frequency recovery is performed using the heterodynes 110 and 130 of the pilot tone. After down-conversion, the upper and lower side bands each contain a peak (referred to herein as pilot tone transforms) due to a corresponding one of the heterodynes 110 and 130. The pilot tone transforms will be at the same frequency (corresponding to the set frequency of the pilot tone) if the reference signal is frequency locked with the carrier waveform. Thus, by adjusting the frequency of the reference signal such that the pilot tone transforms in the upper and lower sidebands are driven to the same frequency, the frequencies of the carrier waveform and the reference signal can be synchronized. The frequency of the pilot does not necessarily need to be related to any other frequency in the system. In one embodiment, the data content at the pilot frequency is sufficiently low such that it does not interfere with the use of the pilot in carrier recovery. In some embodiments, the pilot frequency is not constant and is itself modulated for additional signaling.

FIG. 1B illustrates the result of directly converting the received signal using the local oscillator of the receiver when the reference frequency does not exactly match the carrier frequency 120 of the received signal. If the reference frequency exactly matches the carrier frequency 120, then the carrier will become a DC term which can be completely removed. However, in practice, before being locked, there will be a small frequency offset 165 (e.g., 200 kHz) between the carrier 120 and the local oscillator. This difference 165 will result in a non-DC remnant of the carrier 160 being left over after the conversion.

Similarly, if the reference signal generated by the local oscillator and carrier 120 were frequency-matched, the upper and lower sideband pilot tone transforms 170 and 190 would appear in the converted signal as peaks in frequency space located at frequencies that are plus and minus the pilot frequency 180 respectively (e.g., +/−1 MHz). As a negative frequency is not physically meaningful, the peak corresponding to the lower sideband wraps around and appears as a peak at the pilot frequency 180, and thus the upper and lower sideband pilot tone transforms 170 and 190 result in a single peak in frequency space at the pilot frequency 180 with an amplitude that is twice that of the individual transforms. However, in the case of a frequency offset 165, the upper sideband transform 190 appears in frequency space at the pilot frequency 180 plus the frequency offset 165 and the lower sideband transform 170 is at the pilot frequency minus the frequency offset (due to wrap around). Consequently, the upper sideband transform 190 and the lower sideband transform 170 are separated by twice the frequency offset 165. By comparing the position of the transforms 170 and 190 in frequency space, the frequency offset between the carrier waveform 120 of the received signal and the reference waveform generated by the local oscillator can be determined. In addition, by phase comparing the transforms and forcing them to have the same phase (e.g., by using a PFD), the phase of the local oscillator can be matched to the phase of the carrier, as described below with reference to FIG. 2.

Figure 2:
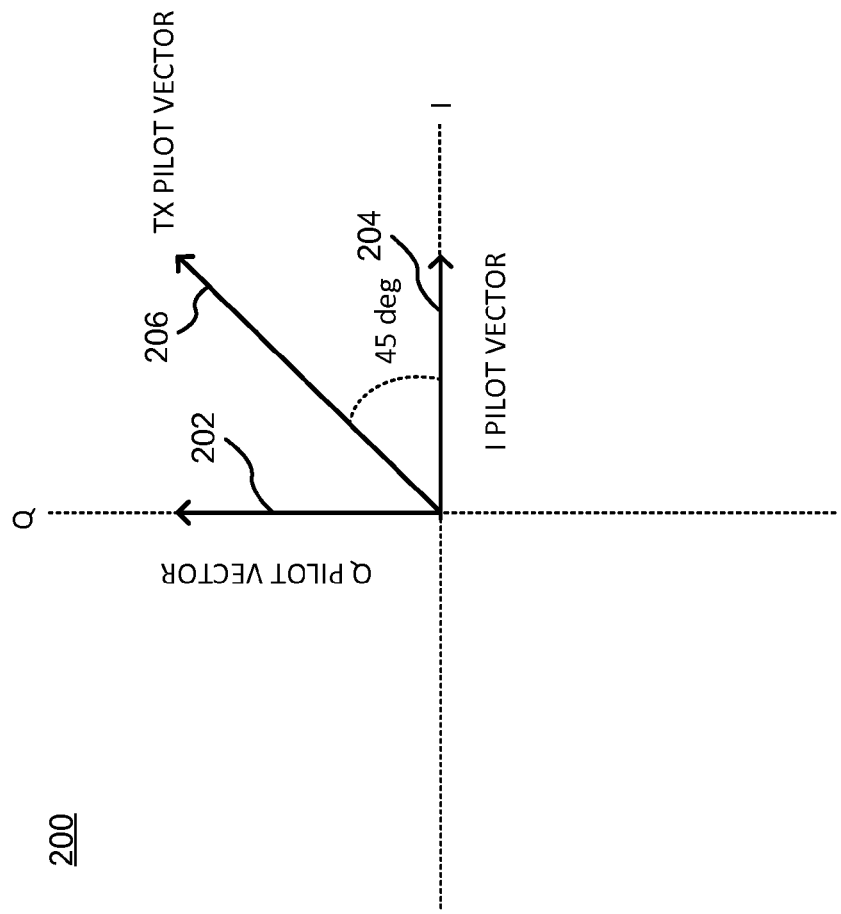
FIG. 2 is a chart illustrating the combined pilot vector generated by combining the transform of a pair of pilot tones present in the I and Q channels, according to one embodiment.

FIG. 2 illustrates the combined pilot vector generated by combining the transform of a pilot tone present in the I and Q channels, according to one embodiment. The pilot tone is transmitted with equal power in the I and Q channels. Thus, at the transmitter, the Q pilot vector 202 and the I pilot vector 204 are equal in magnitude, and their combination (TX PILOT VECTOR 206) has an angle of 45 degrees. If the local oscillator at the receiver is perfectly phase matched with the carrier of the received signal, then the decoded I and Q pilot vectors will be equal in magnitude, and the combined pilot vector will remain at 45 degrees. However, if the local oscillator is not phase-matched to the carrier, one of the decoded pilot vectors will have a greater magnitude than the other, and consequently the combination will have an angle other than 45 degrees. If the decoded Q pilot vector has a greater magnitude, the angle of the combined vector will increase and vice versa. The greater the phase discrepancy, the greater the combined vector's angle will shift from 45 degrees. Thus, the angle of the decoded combined pilot vector provides a measure of the phase difference between the local oscillator and the carrier of the received signal, and can be used as a feedback term to lock the phase of the local oscillator to that of the carrier as part of a feedback loop. This is described in greater detail below with reference to FIGS. 7 and 8, which illustrate examples where the phase difference is −20 and +20 degrees.

Figure 7:
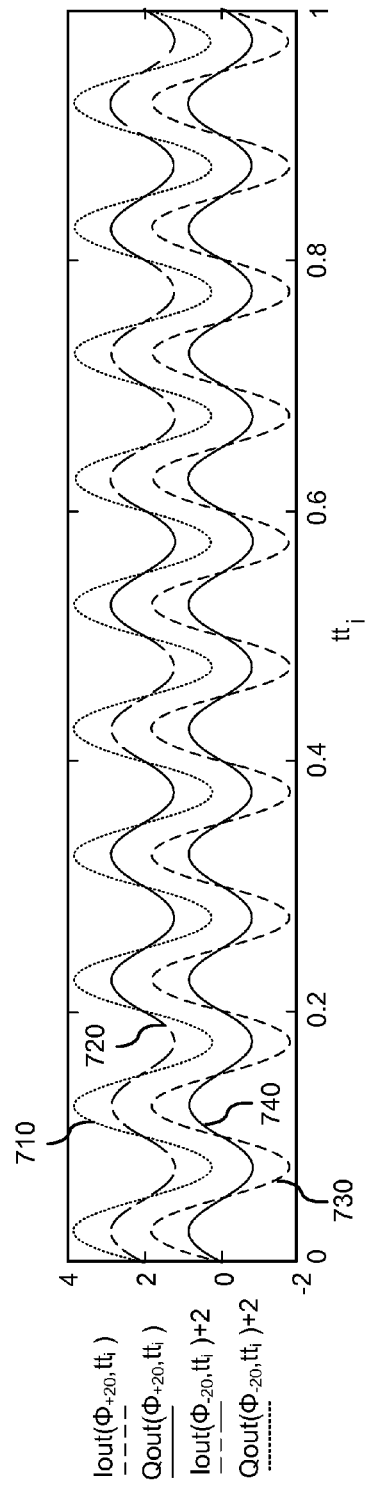
FIG. 7 illustrates the amplitude of the pilot tone in the I and Q channels for a −20 and +20 degree phase difference between the carrier and the local oscillator, according to one embodiment.

Referring first to FIG. 7, curve 730 illustrates the I-channel and curve 740 illustrates the Q-channel in the case where there is a +20 degree phase difference between the carrier and the local oscillator. Note that in this scenario the pilot tone appearing with greater amplitude in the I-channel than the Q-channel. Conversely, if there is a −20 degree phase difference, the pilot tone will appear with a greater amplitude in the Q-channel than the I-channel, as demonstrated by curves 710 and 720.

Figure 8:
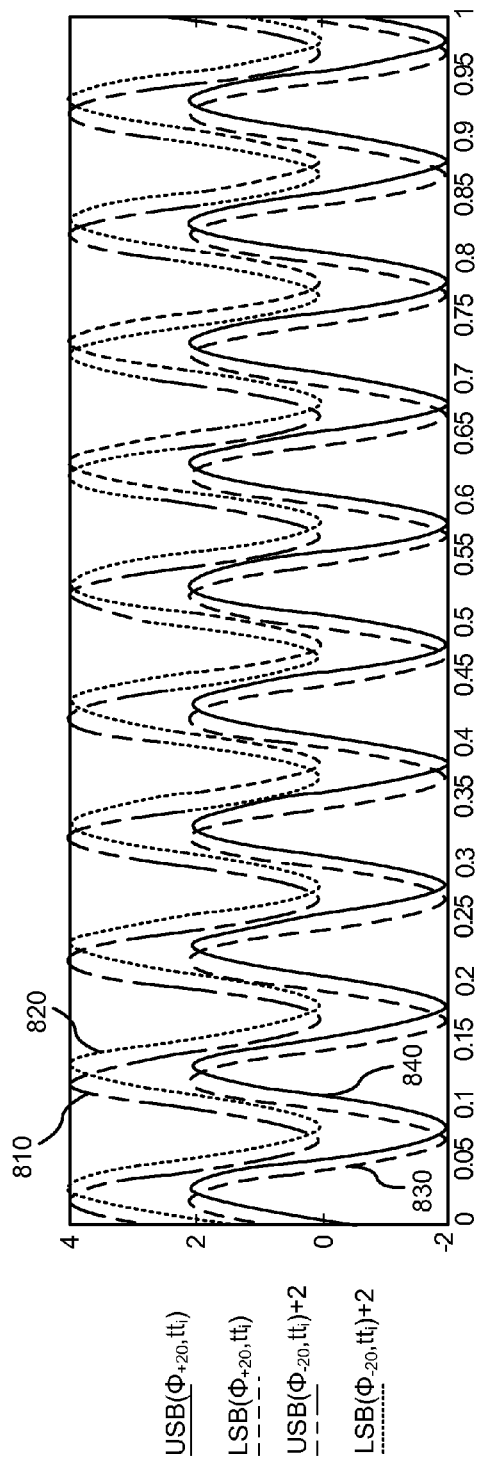
FIG. 8 illustrates the transforms of the pilot tone in the upper and lower sidebands for a −20 and +20 degree phase difference between the carrier and the local oscillator, according to one embodiment.

Referring now to FIG. 8, curve 840 illustrates the upper sideband and curve 830 illustrates the lower sideband in the case where there is a +20 degree phase difference between the carrier and the local oscillator. Note that there is a phase discrepancy between the sidebands, with the upper sideband lagging the lower sideband by an amount that is directly related to the magnitude of the phase difference between the carrier and the local oscillator. Conversely, if there is a −20 degree phase difference, the upper sideband leads the lower sideband, as demonstrated by curves 810 and 820. Thus, by adjusting the local oscillator such that the transform of the pilot tone in the upper and lower sidebands is forced in-phase, the local oscillator can be phase-matched to the carrier of the received signal.

In some embodiments, phase recovery is additionally or alternatively performed by measuring the difference-in-magnitudes of the amplitudes of the in-phase (I) and quadrature (Q) frequency locked channels of the received signal. The difference-in-magnitudes is used to determine both the amplitude and direction of the phase error, and is used in a feedback control loop to adjust the phase of the reference signal generated by the local oscillator. In one such embodiment, the phase of the local oscillator is approximately matched to that of the carrier using the transforms 170 and 190 of the pilot tone and the difference-in-squares method is used to fine-tune the phase. For example, the difference-in-magnitudes method may correct for errors due to distortion and/or systematic errors within the receiver. In other embodiments, the additional or alternate phase recovery is used by comparing the magnitude of the I and Q channels in different ways.

Exemplary System Structure

Figure 3:
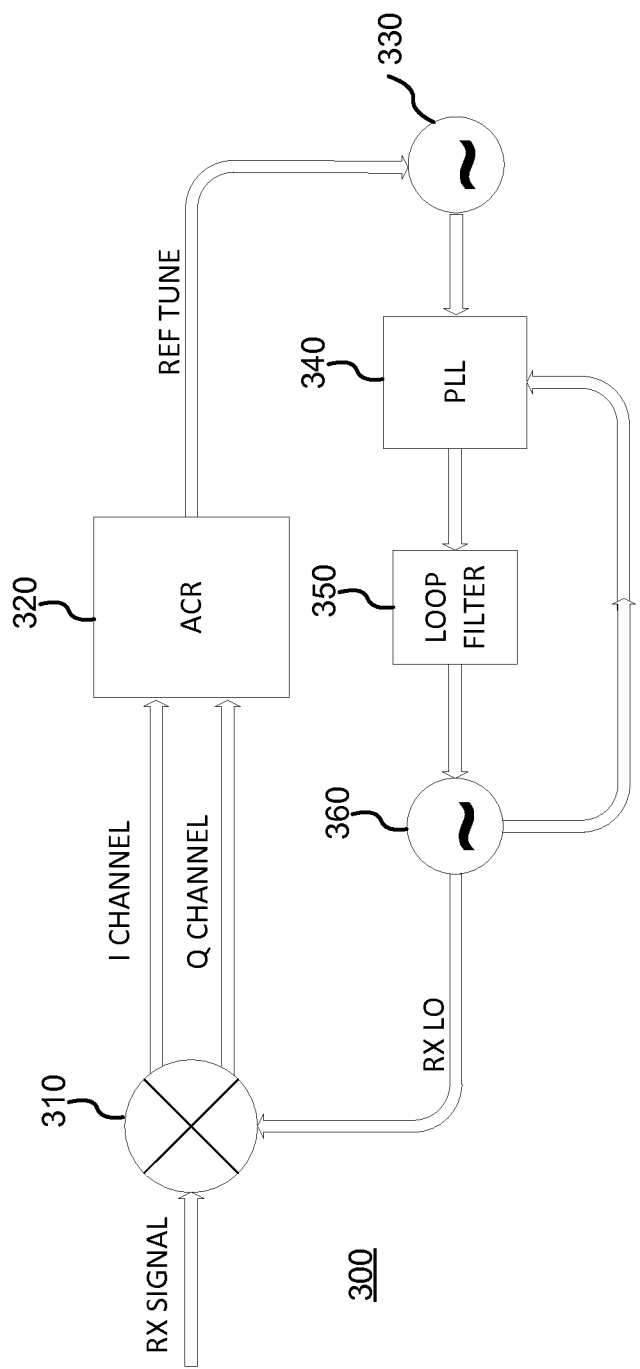
FIG. 3 is a high-level block diagram illustrating a QPSK receiver including an analog carrier recovery system, according to one embodiment.

FIG. 3 illustrates a QPSK receiver 300 including an analog carrier recovery system 320, according to one embodiment. The receiver 300 receives a signal (RX SIGNAL) and combines mixes it with in-phase and quadrature signals (RX LO) from a first local oscillator 360 to generate I and Q signals respectively. At least a portion of each signal is directed to an analog carrier recovery system 320, which determines a frequency and phase error for the first local oscillator 360 relative to the carrier of the received signal. A signal representing the frequency and phase error (REF TUNE) is directed to a second local oscillator 330 in order to update the reference signal generated by the first local oscillator 360 such that it more closely matches the carrier of the received signal. In one embodiment, the second local oscillator 330 is a voltage controlled crystal oscillator (VCXO) and the first local oscillator 360 is slaved to the second local oscillator. This configuration, in combination with the PLL 340 and loop filter 350 reduces the amount of phase noise in the signal generated by the first local oscillator 360. In another embodiment, a single VCO 360 is used, with the frequency and phase error feedback being fed directly to the VCO.

Figure 4:
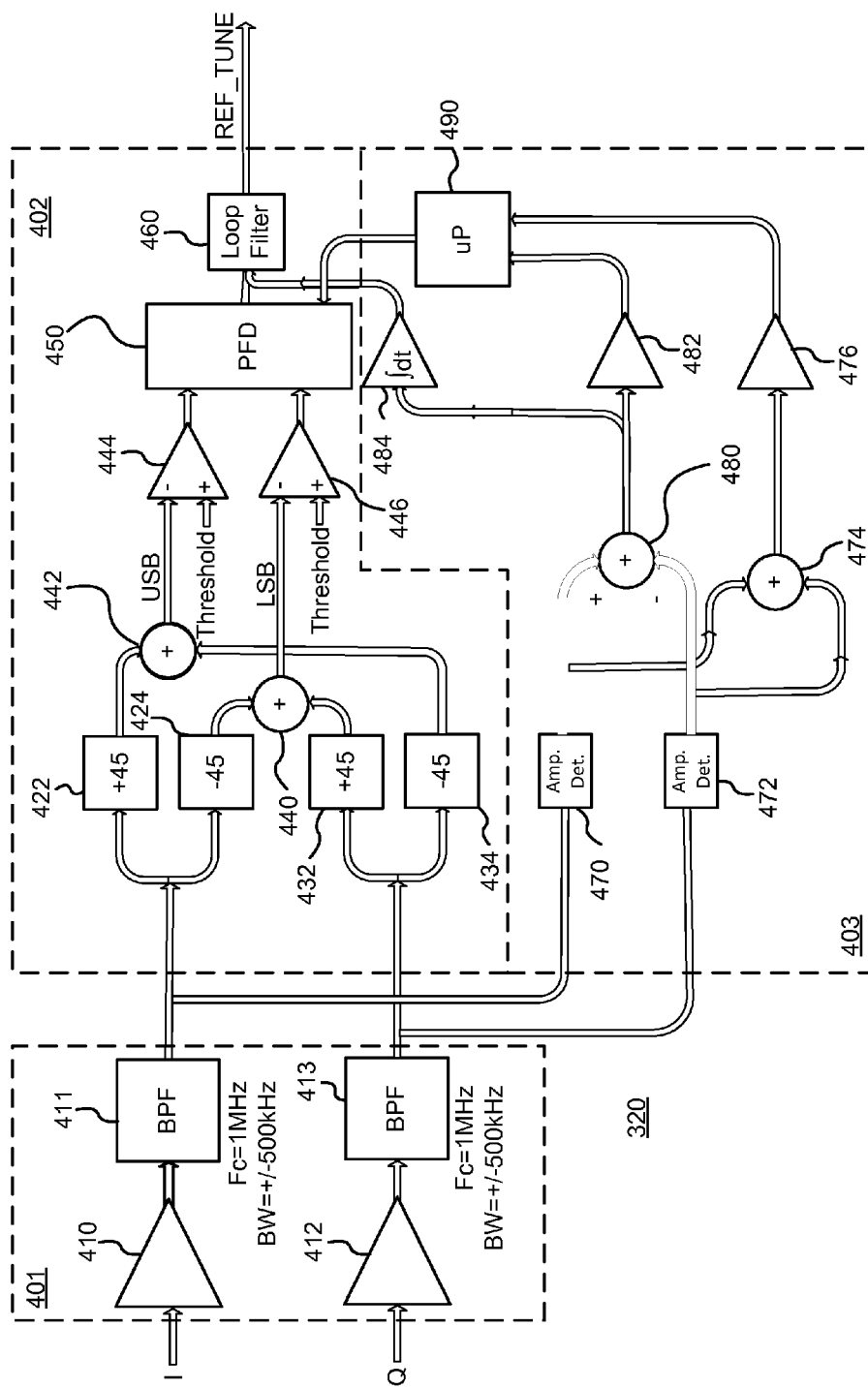
FIG. 4 is a high-level block diagram illustrating the analog carrier recovery system of FIG. 3, according to one embodiment.

FIG. 4 illustrates an analog carrier recovery system 320 of a receiver (e.g., QPSK receiver 300), in accordance with one embodiment. The illustrated embodiment can be conceptually separated into three subsystems: input 401, frequency and primary phase recovery 402, and secondary phase recovery 403. The carrier recovery system 320 can be provided in the form of a dedicated analog circuit board. Alternatively, the components of the system may be distributed across multiple circuit boards and/or other locations. Varying embodiments may include different and/or additional components. Although illustrated and described in the form of an analog circuit implementation, other embodiments may be digitally constructed, for example using Software Defined Radio or DSP techniques.

A portion of each signal is passed to the carrier recovery system 320 for further processing. From here on, the portions of signals provided as input to the carrier recovery system 320 may be referred to as simply "the I channel" and "the Q channel" for brevity. This should not be taken to mean that the entire power of these channels is directed through the carrier recovery system 320. In the embodiment illustrated in FIG. 4, the I and Q channels are amplified using amplifiers 410 and 412. Although the amplifiers 410 and 412 are shown as distinct components, the amplifiers may be provided by a single two channel amplifier. In other embodiments, the signal is amplified prior to channel separation.

The amplified I and Q channels are passed through a corresponding band pass filter (BPF) 411 or 413, which substantially remove the remnant of the carrier 160 and any other residual frequency components outside of the range containing the pilot tone transforms 170 and 190. In one embodiment, the pilot signal has a frequency of 1 MHz and the BPFs 411 and 413 correspondingly have a center frequency of 1 MHz and a bandwidth of +/−500 kHz. In other embodiments, other frequencies (and bandwidths) of BPF 411 and 413 are used, dependent on the specific frequency used by the transmitter as the pilot tone. In further embodiments, the portion of the I and Q signals around the pilot frequency are filtered to separate them from the data portion using other methods, such as diplexing, power splitting, or the like.

The filtered I and Q channel signals are split, with a first portion of each being directed to the frequency and primary phase recovery subsystem 402 and a second portion of each being directed to the secondary phase recovery subsystem 403. In various embodiments, frequency and phase recovery are performed separately and/or the I and Q channel signals are split at a different point in the signal path. For example, the frequency and primary recovery subsystem 402 and the secondary phase recovery subsystem 403 may each include their own amplifiers and BPFs. In one embodiment, only the frequency and primary phase recovery subsystem 402 is used and the secondary phase recovery subsystem 403 is omitted.

Frequency and Primary Phase Recovery

The frequency and primary phase recovery subsystem 402 discriminates the upper side band and the lower sideband signals. These signals represent the translated USB and LSB spectrums of the received signal. The frequency and primary phase recovery subsystem 402 determines the frequency and phase offset between the received signal's carrier waveform and the reference signal generated by the local oscillator by comparing the pilot tone transforms 170 and 190 in the upper and lower sidebands respectively. Note that since the received signal had been down-converted, the sideband content may wrap around and negative frequencies will appear as positive frequencies (with phase inversion).

In the illustrated embodiment of FIG. 4, generating the upper and lower sideband signals comprises splitting the I channel signal into two portions that are directed to a pair of phase shift components 422 and 424, referred to collectively as a lead-lag circuit. The first of the phase shift components 422 introduces a forward phase shift of 45 degrees (+45 degrees) to generate a first "leading" portion of the I channel and the second phase shift component introduces a backward phase shift 45 degrees (−45 degrees) to generate a second "lagging" portion of the I channel, with the total combined phase shift between the leading and lagging portions is approximately ninety degrees. Similarly, the Q channel signal is split into two portions and a lead-lag circuit 432 and 434 introduces a +45 degree phase shift to generate a leading portion and a −45 degree phase shift to generate a lagging portion. In other embodiments, other pairs of phase shift amounts are used to introduce a total phase difference with a magnitude of approximately ninety degrees, such as 0 and 90, −1 and 89, 60 and −30, 110 and 20, −30 and −120, and the like.

The leading portion of the I channel and the lagging portion of the Q channel are combined by a first combiner 442 to generate the upper sideband signal. A second combiner 440 combines the lagging portion of the I channel signal with the leading portion of the Q channel to generate the lower sideband signal. Stated differently, the phase shift components and mixing components effectively perform a Hilbert-Transform to generate the upper and lower sideband signals. In other embodiments, different methods of generating the upper and lower sideband signals are used.

In the embodiment illustrated in FIG. 4, the upper and lower sideband signals are converted from analog to digital using an analog to digital converter. In the illustrated embodiment, this is accomplished by passing the analog upper sideband signal through a first comparator 444 that compares the input voltage of the upper sideband signal to a threshold. The comparator 444 outputs a first voltage (e.g., representing a digital "1") if the input is higher than the threshold and a second voltage (e.g., representing a digital "0") if the input is lower than the threshold. Thus, the comparator 444 converts the analog upper sideband signal into a corresponding digital upper sideband signal. The lower sideband signal is similarly converted to a digital signal by a second comparator 446. In other embodiments, analog to digital converters other than comparators 444 and 446 are used. Further, although the comparators 444 and 446 are shown as distinct components, the analog to digital conversion may be provided by a single two channel component.

In other embodiments, the phase and frequency comparison of the USB and LSB is performed in an analog fashion, obviating the need for digital conversion of the signals. One analog embodiment comprises a simple mixer with the $2*f_o$ term filtered out and only the difference frequency terms used to provide the sine of the phase error. For this case, one leg of the signal would be phase-shifted by 90 degrees. Otherwise the USB and LSB would lock at 90 degrees out of phase.

The upper and lower sideband signals are used to determine an estimate for the difference between the frequency of the carrier waveform and reference frequency generated by the local oscillator. The estimated difference is used to adjust the local oscillator such that the reference signal is more closely matched to the carrier waveform. In the embodiment shown, the digital upper and lower sideband signals are provided to a PFD 450 as input. The PFD 450 performs a frequency comparison and generates an error signal which indicates the magnitude and direction of the frequency error, for example, using the method described above with reference to FIGS. 1A and 1B. The frequency and primary phase recovery subsystem 402 also locks the phase of the local oscillator to that of the carrier waveform. As described above with reference to FIG. 2, by driving the phase of the USB and LSB signals to the same phase, the PFD 450 locks the local oscillator to the phase of the carrier of the received signal.

The error signal is output to a loop filter 460 which may be active (as shown) or passive and drives the second local oscillator 360 such that the error signal is minimized. Closing the tuning loop in this fashion completes the PLL. The closed loop bandwidth of this PLL determines the tracking bandwidth of the receiver.

Phase Recovery

As mentioned previously, distortions and systematic errors within the receiver can result in differences in phase between the transmit carrier and the local oscillator, which in turn may cause tracking errors. To correct for this, some embodiments employ a secondary phase recovery subsystem 403 that measures the difference in magnitude (e.g., a difference in the amplitude, power, log of amplitude, etc.) between the I and Q channels. As the pilot tone was transmitted with equal power in the I and Q channels, the difference in power can be used to generate an error signal that is proportional to the phase error. The determined difference is used to adjust the local oscillator such that the phase of the reference signal more closely matches that of the received carrier waveform. As described above, in the illustrated embodiment of FIG. 4, the second portions of the filtered I and Q channel signals outputted by the BPFs 411 and 413, respectively, are directed to the secondary phase recovery subsystem 403 of the carrier recovery system 320. In other embodiments, the signals used as input for the secondary phase recovery subsystem 403 are tapped from different positions in the signal path.

In the illustrated embodiment, the I and Q channel signals are fed to amplitude detectors 470 and 472 (e.g., log-amps, square-law detectors, etc.) respectively. A portion of the output from each amplitude detector 470 and 472 is directed to a difference circuit 480. The difference circuit 480 subtracts the two amplitude values and provides a phase error signal which can be used to lock the receiver LO directly or, as shown provide a correction term to the PFD 450. Multiple loop feedback can be employed so that both the PFD 450 and the secondary phase recovery subsystem 403 participate in the phase locking of the local oscillator.

A second portion of the output from each amplitude detector 470 and 472 is directed to a summing circuit 474, which sums the outputs. A portion of the output from the difference circuit 480 and the out from the summing circuit 474 are directed to a microprocessor 490 (via amplifiers 482 and 476 respectively). The microprocessor 490 may use this information for measuring the received signal strength, e.g., using the Received Signal Strength Indicator (RSSI) metric.

Test Data Example

Figure 5:
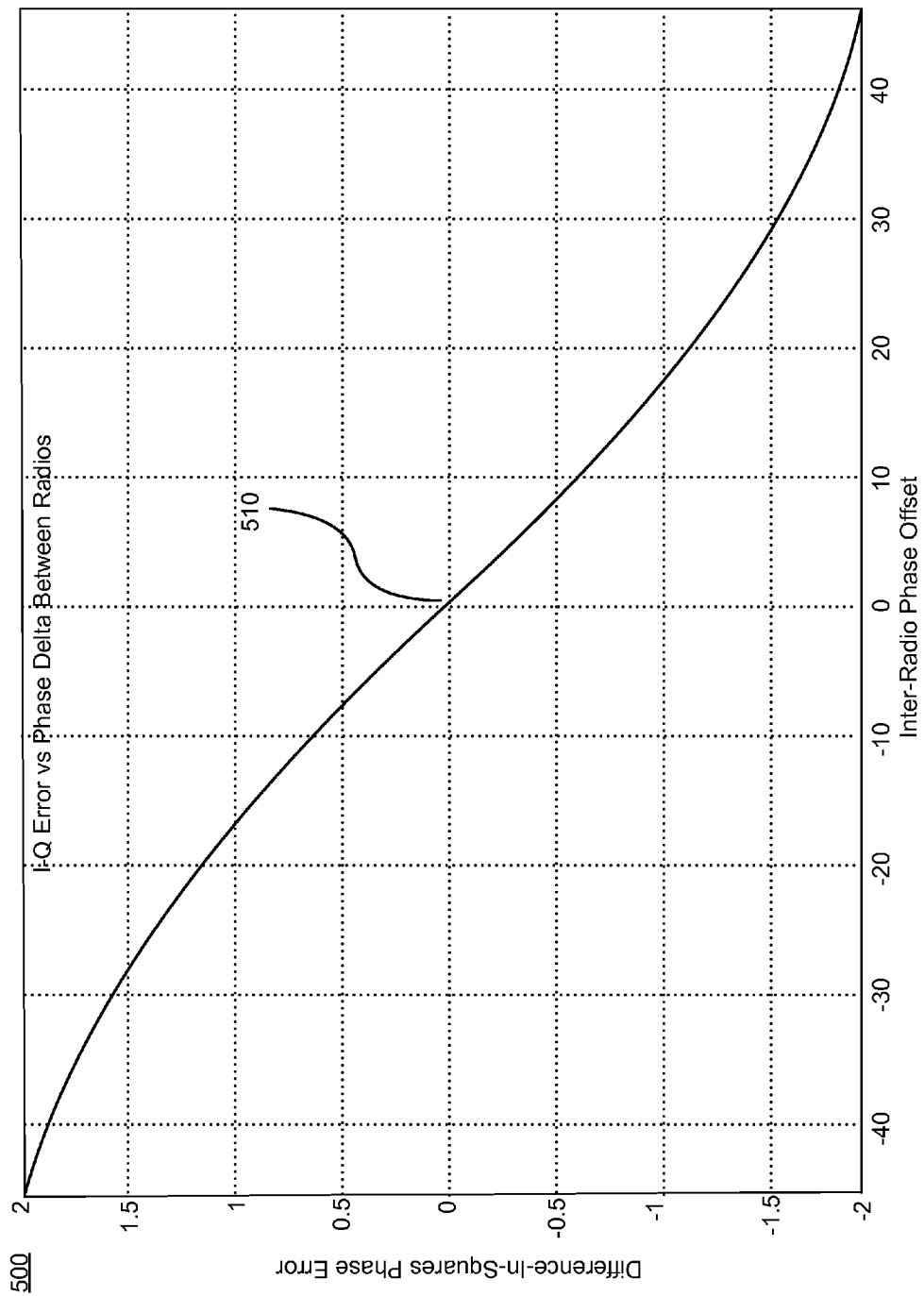
FIG. 5 illustrates the carrier recovery phase error determined using a difference-in-magnitudes method that compares the receiver's I and Q channels over a range from −45 degrees to +45 degrees, according to one embodiment.

FIG. 5 is a chart 500 showing the phase offset for the range −45 to +45 degrees determined using the secondary phase recovery subsystem 403 of the carrier recovery system 300, as described above with respect to FIG. 4, in accordance with one embodiment. Curve 510 (which assumes an I/Q channel amplitude imbalance of 0 dB) illustrates how the secondary phase recovery subsystem 403 distinguishes direction of the phase offset, that is the distinction between a positive and negative phase offset. The curve 510 indicates a value of zero phase error corresponding to a zero degree phase offset (i.e., when the carrier and local oscillator are in-phase). The curve 510 has positive values of phase error for negative phase offsets and negative values of phase error for positive phase offsets. Thus, the direction of the phase offset (and hence the required correction) can be determined from the sign of the error term.

Figure 6:
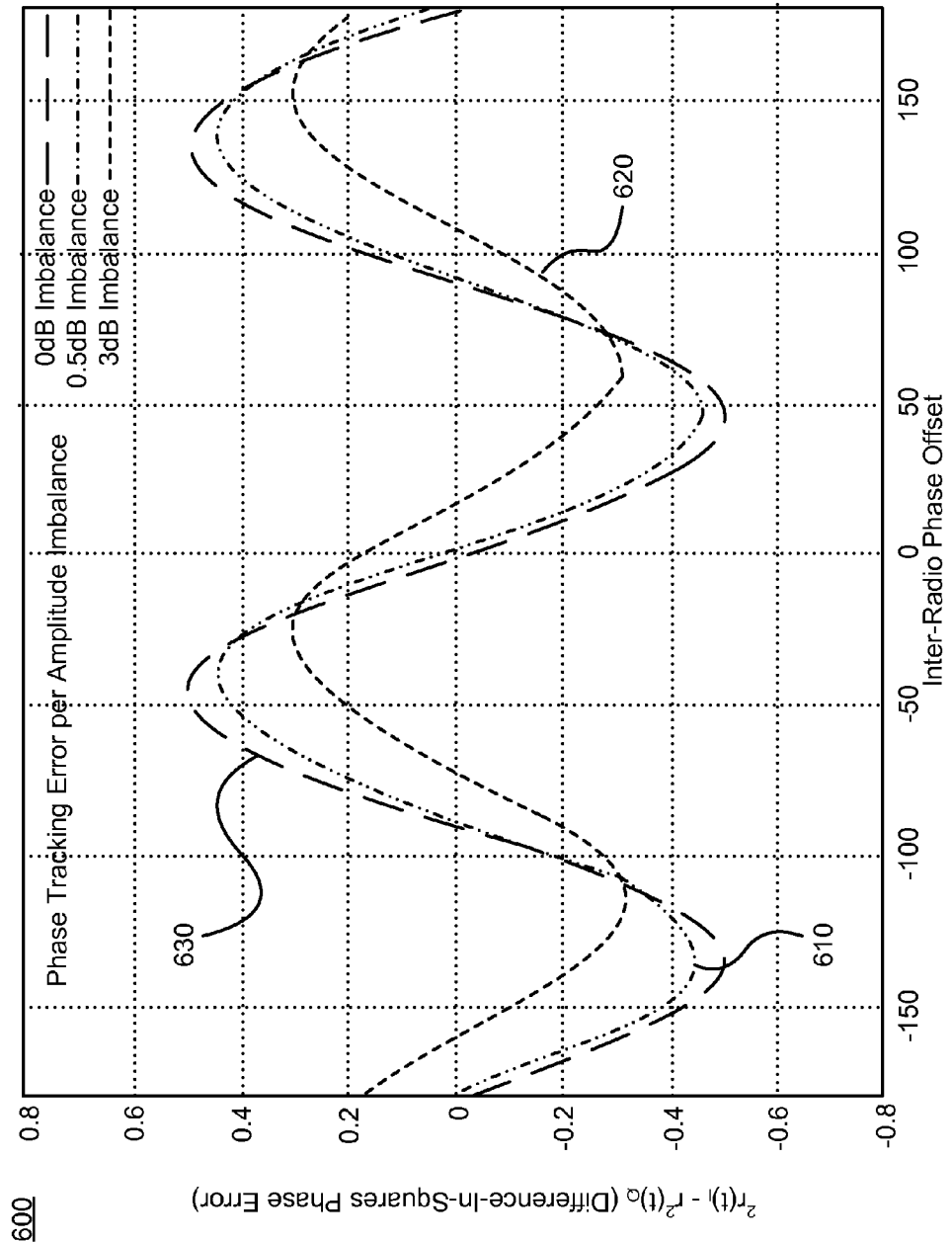
FIG. 6 illustrates the carrier recovery phase error determined by a difference-in-magnitudes method over a range from −180 degrees to +180 degrees having for a range of amplitude imbalances of the receiver's I and Q channels, according to one embodiment.

FIG. 6 is a chart 600 showing the phase offset for the range −180 to +180 degrees determined using the secondary phase recovery subsystem 403 of the carrier recovery system 300 described above with respect to FIG. 4, in accordance with one embodiment. Curve 630 illustrates the ideal case where there is no imbalance between the I and Q channels in the received signal. In this case, curve 630 accurately indicates the direction of correction required for the entire range from −90 degrees to +90 degrees. If the phase difference is larger than this, the direction of phase difference can be deduced by the secondary phase recovery subsystem 303 in conjunction with the frequency and primary phase recovery subsystem 402. Curves 610 and 620 illustrate the performance of the difference-in-magnitudes method when there is a channel imbalance of 0.5 dB and 3 dB respectively.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, may be convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules (e.g., a software defined radio), alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability. Embodiments of the invention may also relate to a product that is produced by a computing process described herein. Such a product may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A system for performing carrier recovery in a radio-frequency communications receiver, the system comprising:
   an input subsystem configured to receive a quadrature-encoded signal comprising a carrier waveform having a carrier frequency and a pilot tone having a pilot frequency;
   a frequency recovery subsystem configured to:
      process the quadrature-encoded signal to produce an upper sideband signal and a lower sideband signal;

identify, in the upper sideband signal, an upper sideband transform of the pilot tone;

identify, in the lower sideband signal, a lower sideband transform of the pilot tone;

determine a frequency difference between the upper sideband transform and the lower sideband transform; and adjust a frequency of a local oscillator of the receiver based on the frequency difference.

2. The system of claim 1, wherein the frequency difference between the upper sideband transform and the lower sideband transform is twice a difference between the frequency of the local oscillator before adjustment and the carrier frequency.

3. The system of claim 1, wherein the input subsystem is further configured to mix the quadrature encoded signal with a reference signal generated by a local oscillator to produce an I channel and a Q channel, the I channel and the Q channel separated by a non-zero number of degrees relative to each other, and the frequency recovery subsystem is further configured to:

produce the upper sideband signal by combining a leading portion of the I channel with a lagging portion of the Q channel; and produce the lower sideband signal by combining a lagging portion of the I channel with a leading portion of the Q channel.

4. The system of claim 3, wherein the frequency recovery subsystem is further configured to:

phase shift a portion of the I channel forward by a number of degrees to generate the leading portion of the I channel; and phase shift a portion of the Q channel backward by a corresponding number of degrees to generate the lagging portion of the Q channel, wherein the lagging portion of the Q-channel lags the leading portion of the I-channel by approximately ninety degrees.

5. The system of claim 3, wherein the frequency recovery subsystem is further configured to:

phase shift a portion of the I channel backward by a number of degrees to generate the lagging portion of the I channel; and phase shift a portion of the Q channel forward by a corresponding number of degrees to generate the leading portion of the Q channel, wherein the leading portion of the Q-channel leads the lagging portion of the I-channel by approximately ninety degrees.

6. The system of claim 1, wherein the carrier frequency is in a range of 71 GHz to 76 GHz, 81 GHz to 86 GHz, and 92 GHz to 95 GHz, and the pilot frequency is in a range from 500 kHz to a data clock frequency.

7. The system of claim 1, wherein the input subsystem is further configured to mix the quadrature encoded signal with a reference signal generated by the local oscillator to produce an I channel and a Q channel, the I channel and the Q channel separated by a non-zero number of degrees relative to each other, the system further comprising a phase recovery subsystem configured to:

determine a difference-in-magnitudes between the I channel and the Q channel;

determine a phase error comprising a magnitude and a direction based on the difference-in-magnitudes; and adjust a phase of the local oscillator based on the magnitude and the direction of the phase error.

8. The system of claim 7, wherein the phase recovery subsystem determines the difference-in-magnitudes by:

determining a difference between an amplitude of the I channel squared and an amplitude of the Q channel squared.

9. The system of claim 7, wherein the difference-in-magnitudes is determined by a difference circuit.

10. A non-transitory computer-readable storage medium storing computer executable code for performing carrier recovery in a radio-frequency communications system, the computer executable code comprising instructions for:

receiving a quadrature-encoded signal comprising a carrier waveform having a carrier frequency and a pilot tone having a pilot frequency;

processing the quadrature-encoded signal to produce an upper sideband signal and a lower sideband signal;

identifying, in the upper sideband signal, an upper sideband transform of the pilot tone;

identifying, in the lower sideband signal, a lower sideband transform of the pilot tone;

determining a frequency difference between the upper sideband transform and the lower sideband transform; and adjusting a frequency of a local oscillator of the receiver based on the frequency difference.

11. The computer-readable medium of claim 10, wherein the instructions for processing the quadrature-encoded signal comprise instructions for:

mixing the quadrature encoded signal with a reference signal generated by the local oscillator to produce an I channel and a Q channel, the I channel and the Q channel separated by a non-zero number of degrees relative to each other;

producing the upper sideband signal by combining a leading portion of the I channel with a lagging portion of the Q channel; and producing the lower sideband signal by combining a lagging portion of the I channel with a leading portion of the Q channel.

12. The computer-readable medium of claim 11, wherein the instructions for producing the upper sideband signal comprise instructions for:

phase shifting a portion of the I channel forward by a number of degrees to generate the leading portion of the I channel; and phase shifting a portion of the Q channel backward by a corresponding number of degrees to generate the lagging portion of the Q channel, wherein the lagging portion of the Q-channel lags the leading portion of the I-channel by approximately ninety degrees.

13. The computer-readable medium of claim 11, wherein the instructions for producing the lower sideband signal comprise instructions for:

phase shifting a portion of the I channel backward by a number of degrees to generate the lagging portion of the I channel; and phase shifting a portion of the Q channel forward by a corresponding number of degrees to generate the leading portion of the Q channel, wherein the leading portion of the Q-channel leads the lagging portion of the I-channel by approximately ninety degrees.

14. The computer-readable medium of claim 10, wherein the carrier frequency is in a range of 71 GHz to 76 GHz, 81 GHz to 86 GHz, and 92 GHz to 95 GHz, and the pilot frequency is in a range from 500 kHz to a data clock frequency.

15. The computer-readable medium of claim 10, wherein the computer executable code further comprises instructions for:
- mixing the quadrature encoded signal with a reference signal generated by the local oscillator to produce an I channel and a Q channel, the I channel and the Q channel separated by a non-zero number of degrees relative to each other;
- determining a difference-in-magnitudes between the I channel and the Q channel
- determining a phase error comprising a magnitude and a direction based on the difference-in-magnitudes; and
- adjusting a phase of the local oscillator based on the magnitude and the direction of the phase error.

16. The computer-readable medium of claim 10, wherein determining the difference-in-magnitudes comprises:
- determining a difference between an amplitude of the I channel squared and an amplitude of the Q channel squared.

* * * * *